United States Patent [19]
Rickfelder et al.

[11] Patent Number: 5,791,772
[45] Date of Patent: Aug. 11, 1998

[54] LAMP ASSEMBLY WITH LIGHT PIPE, LIGHT PIPE AND LIGHT PIPE/LENS ASSEMBLY

[75] Inventors: John Rickfelder, Grand Haven; Rick Mousseau, Holland; Michael J. Sweers, Williamson, all of Mich.

[73] Assignees: Donnelly Corporation, Holland, Mich.; Toyota Motor Corporation, Japan

[21] Appl. No.: 784,028

[22] Filed: Jan. 15, 1997

Related U.S. Application Data

[60] Provisional application No. 60/009,952 Jan. 6, 1996.
[51] Int. Cl.[6] ............................................. F21V 5/00
[52] U.S. Cl. .................. 362/329; 362/31; 362/74; 362/83.3; 362/339
[58] Field of Search .................. 362/31, 74, 83.3, 362/329, 339, 326, 330, 340

[56] References Cited

U.S. PATENT DOCUMENTS

| | | |
|---|---|---|
| 4,371,916 | 2/1983 | De Martino . |
| 4,918,577 | 4/1990 | Furudate . |
| 4,933,818 | 6/1990 | Eckmann ............................ 362/61 |
| 4,965,950 | 10/1990 | Yamada ............................ 362/31 X |
| 5,150,960 | 9/1992 | Redick . |
| 5,184,888 | 2/1993 | Sakuma et al. ................... 362/136 |
| 5,377,083 | 12/1994 | Tada . |
| 5,434,754 | 7/1995 | Li et al. . |
| 5,590,945 | 1/1997 | Simms ............................... 362/31 |

Primary Examiner—Ira S. Lazarus
Assistant Examiner—Nhat-Hang H. Lam
Attorney, Agent, or Firm—Rader, Fishman, Grauer & McGarry

[57] ABSTRACT

The invention relates to a light pipe which includes a more effective light collector which transmits a larger amount of illumination to a lens located adjacent the light pipe. A lamp assembly includes a housing having walls defining a chamber and an open front. A lamp is mounted in the housing as well as a lens which covers the open front of the housing. The lens has a portion which extends laterally of the housing chamber. A light pipe is mounted to the housing adjacent the lens for collecting and distributing the light from the lamp along the laterally-extending portion of the lens. For more effective transmission of the light in a light distribution portion of the light pipe, the light-distributing portion can be provided with grooves along a surface distal from the lens to direct light from the light-collecting portion toward the lens. A light-collecting portion of the light pipe can be provided with a parabolic collecting surface facing the lamp to increase the light collection capabilities of the light-collecting portion of the light pipe.

18 Claims, 2 Drawing Sheets

LAMP ASSEMBLY WITH LIGHT PIPE, LIGHT PIPE AND LIGHT PIPE/LENS ASSEMBLY

CLAIM OF PRIORITY

The application claims priority pursuant to 35 U.S.C. § 119 of U.S. provisional patent application Ser. No. 60/009, 952, filed Jan. 16, 1996.

BACKGROUND OF THE INVENTION

1. Field of the Invention

This invention relates to a lamp assembly. In one of its aspects, the invention relates to a vehicle interior light, and more specifically, to a vehicle interior light having an integral light pipe to provide uniform illumination to an exterior lens. In another of its aspects, the invention relates to a light pipe. In still another of its aspects, the invention relates to a lens and light pipe assembly.

2. Description of Related Art

In automotive vehicle overhead consoles, many components may be packed into a relatively small space, leaving a small space for a light bulb. However, the design of the vehicle interior accessories may include a lens which spans an area of an adjacent component as well as the space containing the light source. However, it is desirable to illuminate the lens uniformly with no exceptional bright or shaded regions. This exterior visual appearance is difficult to achieve in these circumstances in which portions of the lens may be shielded from the light source by adjacent components.

The problem of uniformly illuminating an entire length A of a translucent lens 15 disposed within a housing 12 mounted, for example, to a roof 30 of a vehicle interior 40 is illustrated in FIG. 1. The housing 12 is provided with a light source 16 which would typically emit light rays to the entire length A of the lens 15. However, the housing 12 can be provided with an irregular indentation such as that formed by depending walls 32 and 34 caused by the abutting relationship of the housing 12 with an additional vehicle interior component 38. The indentation in the housing 12 formed by the walls 32 and 34 causes an obstruction of the light rays emitted from the light source 16 to a particular portion of the translucent lens 15. When such an obstruction is formed in the housing 12, the light rays emitted from the light source 16 are blocked to a particular area on the attached lens 15 resulting in a uniformly illuminated portion B and a non-uniformly illuminated portion of the lens 15 such as a gray or darkened area C.

Attempts have been made to more evenly illuminate a translucent lens mounted to a housing which contains a light source. For example, it is known to provide an elongated translucent member, often called a "light pipe," which is located between the light source and the translucent lens to distribute light from the light source evenly along the translucent lens. Examples of light pipes used in this manner are disclosed in U.S. Pat. Nos. 5,434,754 to Li et al. and 4,918,577 to Furudate, issued Jul. 18, 1995 and Apr. 17, 1990, respectively.

The Furudate patent discloses a light pipe in a housing having an irregular indentation therein whereby the light pipe, located between a translucent lens and the light source, comprises a light receiving portion located adjacent the light source and an illuminating portion located adjacent the translucent lens to be illuminated. The illuminating portion includes an oblique surface having several semi-circular or sawtooth grooves therein which reflect light received from the light receiving portion in various directions. The light pipe is positioned completely between the light source and the lens.

However, the prior art, including the Furudate patent, appears to have geometrical limitations on the effectiveness of the light pipe disclosed therein to transmit a sufficient amount of light to the translucent lens. The prior art light pipe devices do not collect a sufficient amount of light to illuminate a translucent lens a sufficient amount to provide bright illumination thereto.

SUMMARY OF THE INVENTION

The invention overcomes the limitations of the prior art by providing a light pipe which includes a more effective light collector which transmits a larger amount of illumination to a lens located adjacent the light pipe.

According to the invention, a lamp assembly comprises a housing having walls defining a chamber and an open front, a lamp mounted in the housing, a lens covering the open front of the housing and having a portion extending laterally of the housing chamber, and a light pipe adjacent the lens and mounted to the housing for distributing the light from the lamp along the laterally-extending portion of the lens. The light pipe has a light-distributing and a light collecting portion. The light-distributing portion extends along the laterally-extending portion of the lens and the light-collecting portion extends into the housing chamber between the lamp and a chamber wall for collecting light from the lamp and transmitting the light thus collected into and along the light-distributing portion of the light pipe.

The light-distributing portion of the light pipe can be provided with sawtooth grooves along a surface distal from the lens to direct light from the light-collecting portion toward the lens. In addition, the light-collecting portion of the light pipe can extend substantially perpendicular to the light-distributing portion. The light-collecting portion of the light pipe can be provided with a parabolic collecting surface facing the lamp. Further, the light pipe can have a flange which extends toward the lens between the light-collecting portion and the light-distributing portions which has a trough for receiving the flange on the light pipe for indexing the position of the light pipe with respect to the lens.

Further according to the invention, a light pipe comprises an L-shaped body formed by a light-collecting leg and a light-distributing leg. The light-collecting leg is adapted to transmit light from an adjacent light source to the light-distributing leg of the light pipe.

The light-distributing leg of the light pipe can have a reflecting surface and a transmitting surface. The reflecting surface of the light-distributing leg can have multiple sawtooth grooves to direct light passing through the light-distributing leg toward the reflecting surface. The light-collecting leg of the light pipe can extend substantially perpendicular to the light-transmitting leg. The light-collecting leg of the light pipe can have a parabolic collecting surface. The light pipe can further have an outwardly-extending flange located between the light-collecting leg and the light-transmitting leg thereof.

Still further according to the invention, a light pipe and lens assembly comprises a light pipe having an L-shaped body defined by a light-collecting leg and a light-distributing leg. The lens comprises a panel abutting a lower surface of the light-distributing leg of the light pipe to transmit light from an adjacent light source to the light-distributing portion of the light pipe which further transmits the light to the panel of the lens.

In one embodiment, the light-distributing leg of the light pipe has a reflecting surface and a transmitting surface. The reflecting surface of the light-distributing leg preferably has multiple sawtooth grooves to direct light transmitted through the light-distributing leg toward the reflecting surface. The light-collecting leg of the light pipe extends substantially perpendicular to the light-distributing leg. The light-collecting leg of the light pipe in one embodiment has a parabolic collecting surface. The light pipe preferably has an outwardly-extending flange between the light-transmitting leg and the light-distributing leg of the light pipe and the lens has a trough which receives the flange for indexing the position of the light pipe with respect to the lens.

BRIEF DESCRIPTION OF THE DRAWINGS

The invention will now be described with reference to the drawings wherein.

DESCRIPTION OF THE PREFERRED EMBODIMENTS

Figure 2:
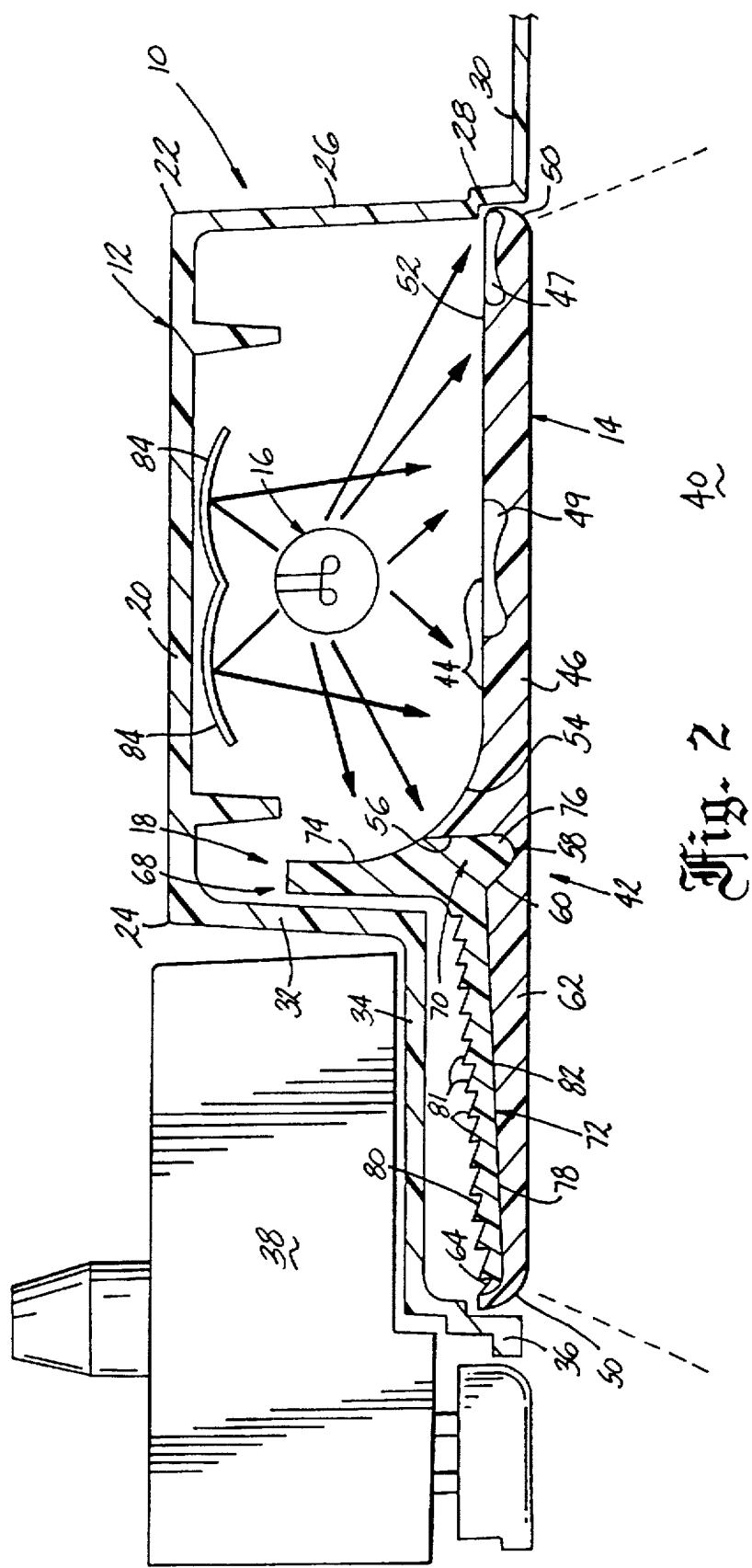
FIG. 2 is a cross-sectional side view of a vehicle interior light having an integral light pipe according to the invention.

Turning now to the drawings and to FIG. 2 in particular, a vehicle interior 40 includes a light assembly 10 comprising a housing 12 typically disposed within a vehicle interior roof 30, a lens 14, a light source 16, and a light pipe 18.

The housing 12 is typically constructed of a rigid plastic material and includes a horizontal roof portion 20 having a first edge 22 and a second edge 24. A vertical wall 26 depends downwardly from the first edge 22 of the roof 20 and further includes a laterally extending flange 28 at its lower edge which terminates at the vehicle interior roof 30 of the vehicle interior 40. A vertical wall 32 depends downwardly from the second edge 24 of the roof 20 which terminates a short distance above the plane of the interior surface of the roof 30 and further includes a longitudinally extending horizontal wall 34 which further terminates in a downwardly depending flange 36. The vertical wall 32 and the horizontal wall 34 essentially create a parallelepiped indentation within the upper portion of the housing 12 such that an abutting component such as a sunroof motor or moon roof motor shown generally at 38 may be compactly designed to abut the housing 12 while still allowing for a longer housing 12 to support the lens 14 which results in a greater surface area for illuminating the vehicle interior 40. A pair of reflectors 84 are mounted above the light source 16 to reflect light from the source 16 downwardly.

The lens 14 is a translucent component having an exterior surface 42 and an interior surface 44. The exterior surface 42 of lens 14 comprises a longitudinal flat portion 46 having first and second rounded ends 48 and 50. The interior surface 44 of lens 14 comprises a longitudinal flat portion 52 extending inwardly from the first rounded end 48 of the lens 14 and terminating in an upwardly extending rounded flange 54. An opposite wall 56 of the flange 54 extends downwardly into a rounded trough 58 which further extends angularly upwardly at 60 which extends into a downwardly tapering portion 62 which terminates at an interior upwardly rounded surface 64 of the second rounded end 50 of the lens 14. The wall 56, trough 58, angular wall 60, tapering wall 62 and the interior rounded surface 64 together form a seat 66 for the light pipe 18. The interior surface 44 of the lens 14 can further include first and second target optics 47 and 49, respectively. The first target optic 47 is disposed near the first rounded end 48 while the second target optic 49 is disposed near the longitudinal midpoint of the flat portion 52. The target optics 47 and 49 each comprise a simple lens of a circular, elliptical or a rectangular shape designed to provide an intensely illuminated zone to the exterior surface 42 of the lens 14, such that the target optics 47 and 49 may be used as map or reading lights.

Figure 4:
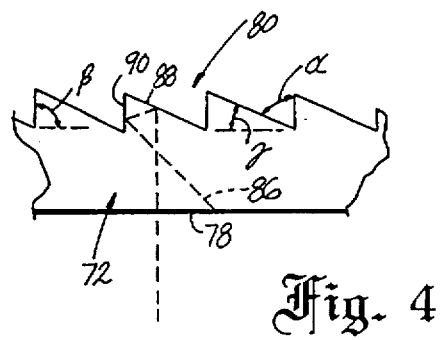
FIG. 4 is an enlarged view of a portion of the light pipe illustrated in FIG. 3.
Figure 1:
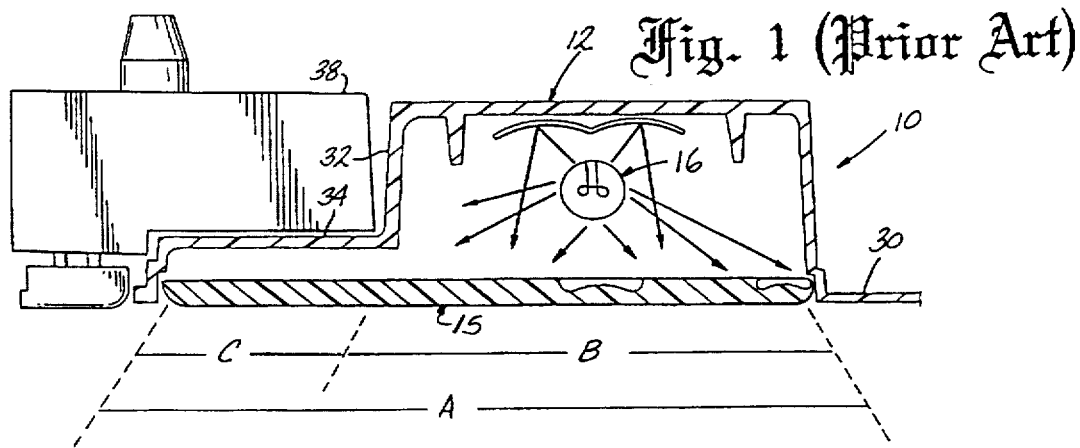
FIG. 1 is a cross-sectional side view of a vehicle interior light housing illustrating the prior art.

The light pipe 18 is a translucent component formed of a clear polycarbonate material having a vertical light-collecting leg 68, a horizontal light-distributing leg 72 and a base 70. The vertical leg 68 includes a parabolic collecting surface 74 which extends curvedly downwardly into the base 70 which includes a downwardly extending rounded flange 76. The parabolic collecting surface 74 has a radius of curvature with a center at the light source 16 so light rays from the light source are collected in the vertical leg 60 and transmitted along the horizontal leg 72. The horizontal leg 72 extends longitudinally and angularly downwardly from the base 70 at acute angle to the flat surfaces of the lens 14. The horizontal leg 72 includes a flat lower surface 78 and a upper surface 80 comprising a plurality of sawtooth grooves 81 which are designed to reflect light rays, which are reflected from the surface 78, downwardly and along the leg 72 toward the interior rounded surface 60 at the distal end of the leg 72. The exterior surfaces of the base 70, rounded flange 76 and the flat lower surface 78 form the underside 82 of the light pipe 18. As illustrated in FIG. 4, the sawtooth grooves are formed from a series of slanted walls 88 and substantially vertical walls 90 which subtend an angle of about 6°. The angle $\beta$ between the walls 90 and the plane of the lower surface of the lens 14 is about 90°. The angle $\gamma$ of the inclined walls 88 with respect to the plane of the lower face of lens 14 is about 30°. The angle of the lower surface 78 with respect to the plane of the lower surface of lens 14 is about 5°. These angular relationships can vary over a wide range depending on the nature of the interior obstruction and the distance of the lens beneath the obstruction. The light pipe 18 is designed to collect light rays emitted from the light source 16 and channel them to the obstructed areas of the exterior translucent lens 14 that do not have direct illumination from the light source 16. The surfaces of the light pipe 18 are optimally configured to efficiently collect all available light not used to illuminate other areas of the exterior translucent lens 14, direct this light to the non-illuminated areas of the lens 14, and capture and contain this light to provide a uniformly illuminated appearance to the lens 14. Various optical properties of the light pipe 18, such as the critical angle of reflection, fresnel reflection, absorption and transmission of the collected light rays, can be taken into consideration to optimize the light propagation capability of the light pipe 18.

In assembly, the interior surface of the roof portion 20 of the housing 12 is provided with a plurality of parabolic reflectors 84 to increase the downward intensity of the light rays emitted from the light source 16. The light source 16 is typically installed into a socket located along an interior wall of the housing 12. The underside 82 of the light pipe 18 matingly contacts the seat 66 on the interior surface 44 of the lens 14, such that the rounded flange 76 rests within the trough 58 and the horizontal leg 72 rests atop the tapering wall 62. The upwardly rounded ends 48 and 50 of the lens 14 may then be snap-fit into the flanges 28 and 36 on the housing 12 to complete the vehicle interior light assembly 10.

Figure 3:
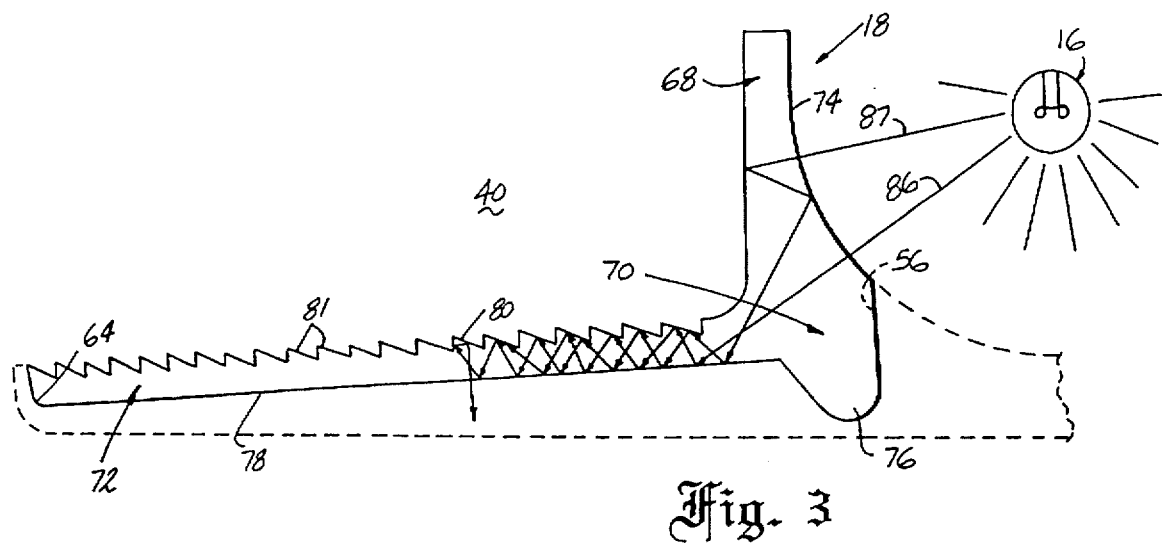
FIG. 3 is a cross-sectional side view of the light pipe illustrated in FIG. 2.

In operation, upon actuation of the light source 16, the parabolic collecting surface 74 of the light pipe 18 collects light rays emitted from the light source 16 which normally would have been absorbed by or undesirably reflected from the vertical wall 32 of the housing 12. The light rays, such as the sample ray 86 shown in FIG. 3, are transmitted to the base 70 and subsequently to the horizontal leg 72 through the optical properties of the light pipe 18. Once the collected light rays such as light ray 86 are transmitted through the base 70 and into the horizontal leg 72, the light rays reflect upwardly off of the flat lower surface 78 and are re-reflected downwardly as the light rays encounter the sawtooth grooves 81 on the upper surface 80. As illustrated in FIG. 4, those rays which strike substantially vertical walls 90 are reflected back to the inclined walls 88 and then reflected downwardly through the lens. Thus, the light is propagated longitudinally through the length of the horizontal leg 72 and downwardly through the lens 14. The light pipe is configured so that the light rays which are reflected downwardly by the inclined walls 88, as described above, are substantially uniform along the length of the leg 72. The light pipe can be optically configured to transmit a sufficient amount of light to the lens 14 such that the portion of the lens 14 illuminated by the light pipe 18 is illuminated an equivalent amount as the portion of the lens 14 which is illuminated directly by the light source 16.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments for which an exclusive property or privilege is claimed are defined as follows:

1. A lamp assembly comprising:
   (a) a housing having walls defining a chamber and an open front;
   (b) a lamp mounted in the housing;
   (c) a lens covering the open front of the housing and having a portion extending laterally of the housing chamber;
   (d) a light pipe adjacent the lens and mounted in the housing for distributing the light from the lamp along the laterally-extending portion of the lens, the light pipe having a light-distributing and a light-collecting portion;
   (e) the light-distributing portion extends along the laterally-extending portion of the lens and the light-collecting portion extends into the housing chamber between the lamp and a chamber wall for collecting light from the lamp and transmitting the light thus collected into and along the light-distributing portion of the light pipe.

2. The lamp assembly of claim 1 wherein the light-distributing portion of the light pipe has sawtooth grooves along a surface distal from the lens to direct light from the light-collecting portion toward the lens.

3. The lamp assembly of claim 2 wherein the light-collecting portion of the light pipe extends substantially perpendicular to the light-distributing portion.

4. The lamp assembly of claim 3 wherein the light-collecting portion of the light pipe wherein light-collecting portion has a parabolic collecting surface facing the lamp.

5. The lamp assembly of claim 3 wherein the light pipe has a flange extending toward the lens between the light-collecting portion and the light-distributing portions and the lens has a trough receiving the light pipe flange for indexing the position of the light pipe with respect to the lens.

6. The lamp assembly of claim 1 wherein the light-collecting portion of the light pipe extends substantially perpendicular to the light-distributing portion.

7. The lamp assembly of claim 1 wherein the light-collecting portion of the light pipe has a parabolic collecting surface facing the lamp.

8. The lamp assembly of claim 1 wherein the light pipe has a flange extending toward the lens between the light-collecting portion and the light-distributing portions and the lens has a trough receiving the light pipe flange for indexing the position of the light pipe with respect to the lens.

9. A light pipe comprising:
   (a) an L-shaped translucent body formed by a light-collecting leg with an elongated side surface and a light-distributing leg;
   (b) the light-collecting leg is shaped and configured to transmit light from a light source adjacent to a side surface of the light-collecting leg to the light-distributing leg of the light pipe;
   (c) the light-distributing leg of the light pipe has a reflecting surface and a transmitting surface; and
   (d) the reflecting surface of the light-distributing leg has multiple sawtooth grooves to direct light transmitted through the light-distributing leg toward the transmitting surface.

10. The light pipe of claim 9 wherein the light-collecting leg of the light pipe extends substantially perpendicular to the light-transmitting leg.

11. The light pipe of claim 9 wherein the light-collecting leg of the light pipe has a parabolic collecting surface.

12. The light pipe of claim 9 wherein the light pipe has an outwardly-extending flange between the light-collecting leg and the light-transmitting leg of the light pipe.

13. A light pipe and lens assembly comprising:
   (a) the light pipe having an L-shaped translucent body defined by a light-collecting leg with an elongated side surface and a light-transmitting leg, the L-shaped body having a lower surface;
   (b) the lens comprising a panel abutting the lower surface of the L-shaped body of the light pipe;
   (c) the light-collecting leg of the light pipe is shaped to transmit light from a light source adjacent to the elongated side surface of the light-collecting leg to the light-distributing leg of the light pipe which further transmits the light to the panel of the lens.

14. The light pipe and lens assembly of claim 13 wherein:
   (a) the light-distributing leg of the light pipe has a reflecting surface and a transmitting surface; and
   (b) the reflecting surface of the light-distributing leg has multiple sawtooth grooves to direct light transmitting through the light-distributing leg toward the reflecting surface.

15. The light pipe and lens assembly of claim 13 wherein the light-collecting leg of the light pipe extends substantially perpendicular to light-distributing leg.

16. The light pipe and lens assembly of claim 13 wherein the light-collecting leg of the light pipe has a parabolic collecting surface.

17. The light pipe and lens assembly of claim 13 wherein the light pipe has an outwardly-extending flange between the light-collecting leg and the light-transmitting leg of the light pipe.

18. The light pipe and lens assembly of claim 13 wherein the light pipe has a flange extending toward the lens between the light-collecting leg and the light-transmitting leg of the light pipe and the lens has a trough receiving the flange for indexing the position of the light pipe with respect to the lens.

* * * * *